United States Patent
Riessbeck et al.

(10) Patent No.: US 11,723,372 B2
(45) Date of Patent: Aug. 15, 2023

(54) FOOD-PREPARATION APPARATUS WITH DIVERTER MECHANISM

(71) Applicant: Eugster/Frismag AG, Amriswil (CH)

(72) Inventors: Wolfgang Riessbeck, Landschlacht (CH); Simon Wäger, Amriswil (CH); Dirk Irmscher, Amriswil (CH)

(73) Assignee: Eugster / Frismag AG, Amriswil (CH)

( * ) Notice: Subject to any disclaimer, the term of this patent is extended or adjusted under 35 U.S.C. 154(b) by 665 days.

(21) Appl. No.: 16/482,792

(22) PCT Filed: Feb. 2, 2017

(86) PCT No.: PCT/EP2017/052217
§ 371 (c)(1),
(2) Date: Aug. 1, 2019

(87) PCT Pub. No.: WO2018/141387
PCT Pub. Date: Aug. 9, 2018

(65) Prior Publication Data
US 2021/0282407 A1   Sep. 16, 2021

(51) Int. Cl.
*A21B 5/03* (2006.01)
*A21B 7/00* (2006.01)
(Continued)

(52) U.S. Cl.
CPC .............. *A21B 5/03* (2013.01); *A21B 7/005* (2013.01); *A21C 9/083* (2013.01); *A21D 8/02* (2013.01); *A21D 8/06* (2013.01)

(58) Field of Classification Search
CPC .... A21B 1/42; A21B 3/07; A21B 5/03; A21D 8/02; A21D 8/06; A21D 10/02;
(Continued)

(56) References Cited

U.S. PATENT DOCUMENTS 2,980,038 A * 4/1961 Royer ................... A21B 3/07
414/152
3,896,922 A * 7/1975 De Jong ................ B65G 17/12
198/802
(Continued)

FOREIGN PATENT DOCUMENTS

| EP | 2241673 A2 * | 10/2010 | ............ E01B 25/26 |
| WO | 2013123809 A1 | 8/2013 | |
| WO | 2013124809 A2 | 8/2013 | |

OTHER PUBLICATIONS

International search report for application No. PCT/EP2017/052217 dated Oct. 18, 2017.

*Primary Examiner* — Drew E Becker
*Assistant Examiner* — Austin Parker Taylor
(74) *Attorney, Agent, or Firm* — Bachman & LaPointe, P.C.

(57) ABSTRACT

A food-preparation apparatus for forming and baking a food product (5) from a dough portion (2) in a capsule (12) includes a housing (3) having a capsule-handling device (4) for opening and/or emptying the capsule (12), an upper plate (14), and a lower plate (11), arranged in the housing (3). The lower plate can be adjusted in a guide device between a receiving position (A) for receiving the dough portion (2) from the capsule (12), a position of interaction (W) for interacting with the upper plate (14) for baking and/or forming the dough portion, and an emptying position (E) wherein the lower plate (11) is inclined relative to a base surface (46) of the food-preparation apparatus. The guide device has a diverter (20) with a diverter element (21), which can be switched between at least two switching positions for predetermining an adjustment distance of the lower plate (11) in the guide device, wherein the diverter element (21) is assigned an electromotive drive (M) for switching the diverter element (21) automatically.

17 Claims, 5 Drawing Sheets

(51) Int. Cl.
*A21D 8/02* (2006.01)
*A21D 8/06* (2006.01)
*A21C 9/08* (2006.01)

(58) Field of Classification Search
CPC ............ A21D 10/025; A21D 13/41–45; A21C 9/08–085; A47J 37/01; A47J 37/015; F24C 15/18
USPC .................... 99/349–351, 372–384; 426/523
See application file for complete search history.

(56) References Cited

U.S. PATENT DOCUMENTS

| | | | | |
|---|---|---|---|---|
| 4,262,586 | A * | 4/1981 | Miller | A47J 37/045 |
| | | | | 118/25 |
| 4,508,025 | A * | 4/1985 | Schultz | A47J 37/046 |
| | | | | 198/406 |
| 4,559,002 | A * | 12/1985 | Atwood | F16P 3/08 |
| | | | | 425/152 |
| 2004/0187706 | A1* | 9/2004 | Glucksman | A21C 11/18 |
| | | | | 99/450.1 |
| 2005/0006208 | A1* | 1/2005 | Armstrong | A21C 11/006 |
| | | | | 198/810.03 |
| 2014/0230660 | A1* | 8/2014 | He | A23L 5/10 |
| | | | | 99/325 |
| 2015/0044340 | A1* | 2/2015 | Ruiz Preciado | A21B 5/03 |
| | | | | 426/389 |

* cited by examiner

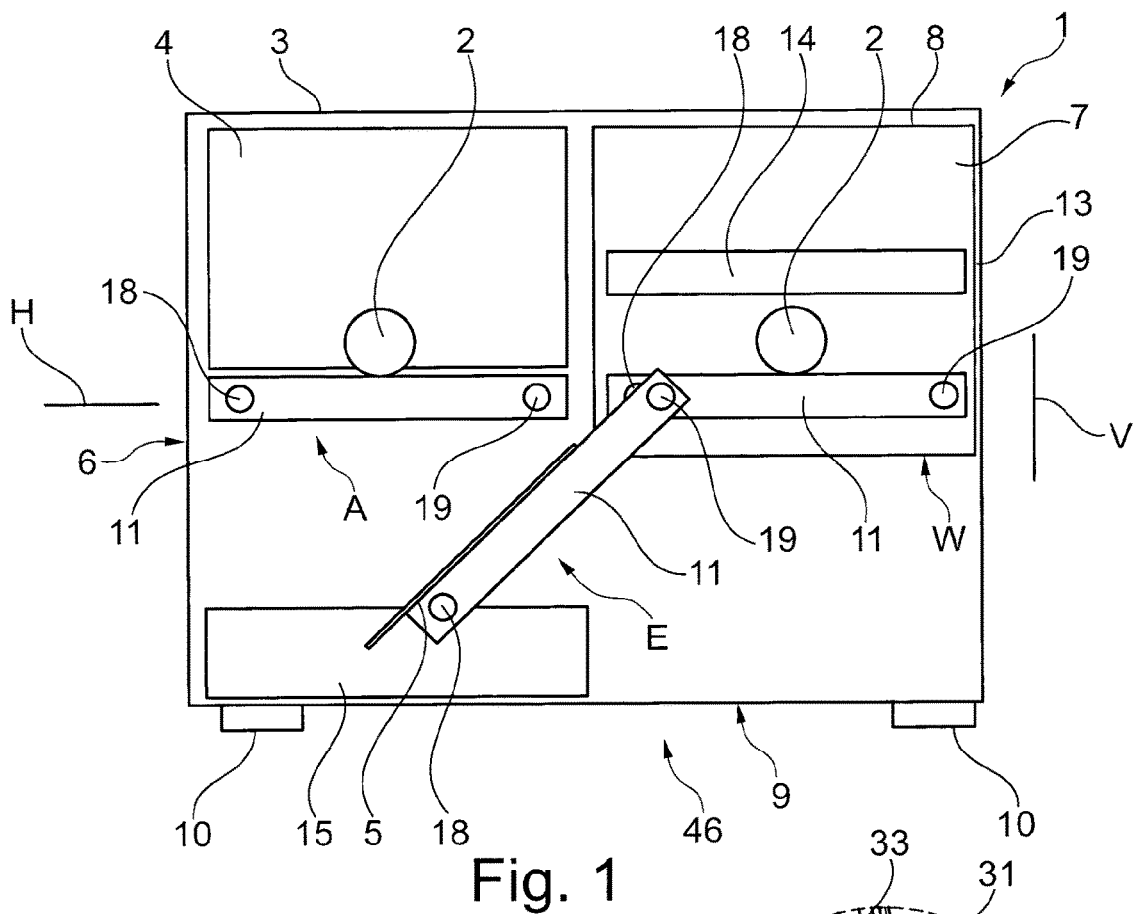
Fig. 1
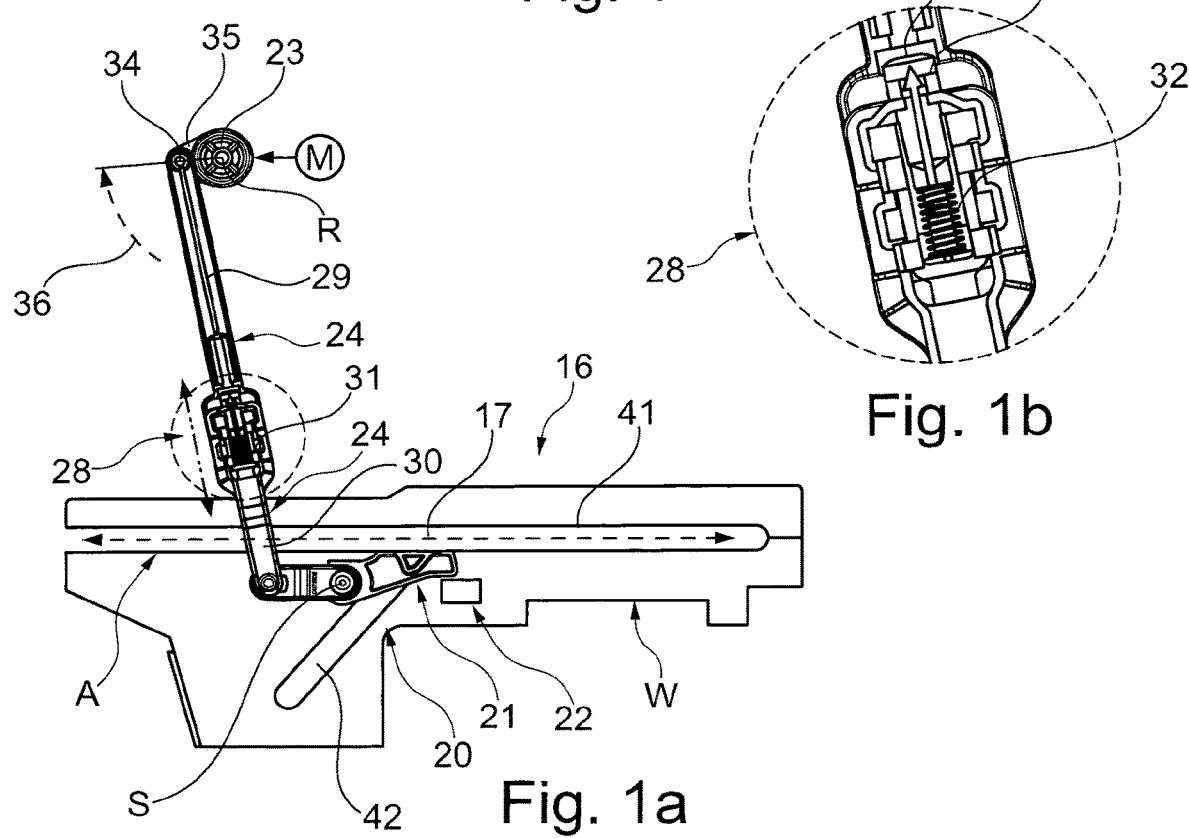
Fig. 1b
Fig. 1a

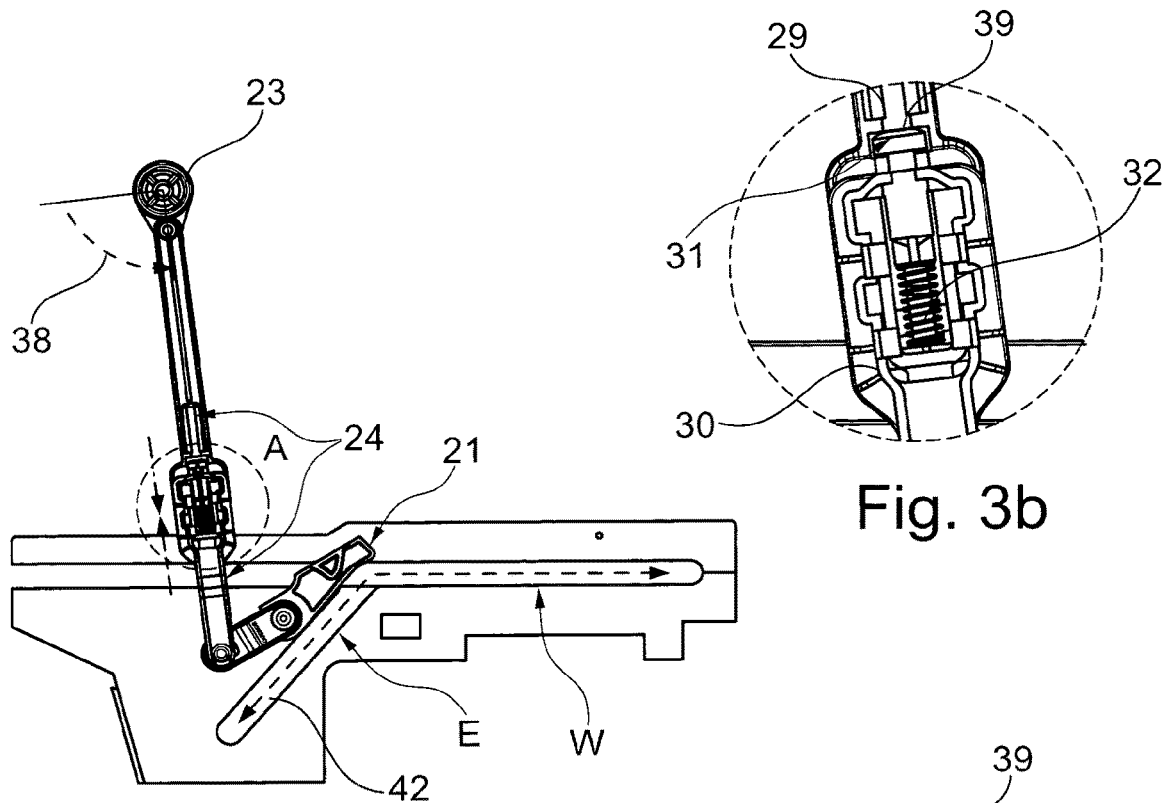
Fig. 3b
Fig. 3a
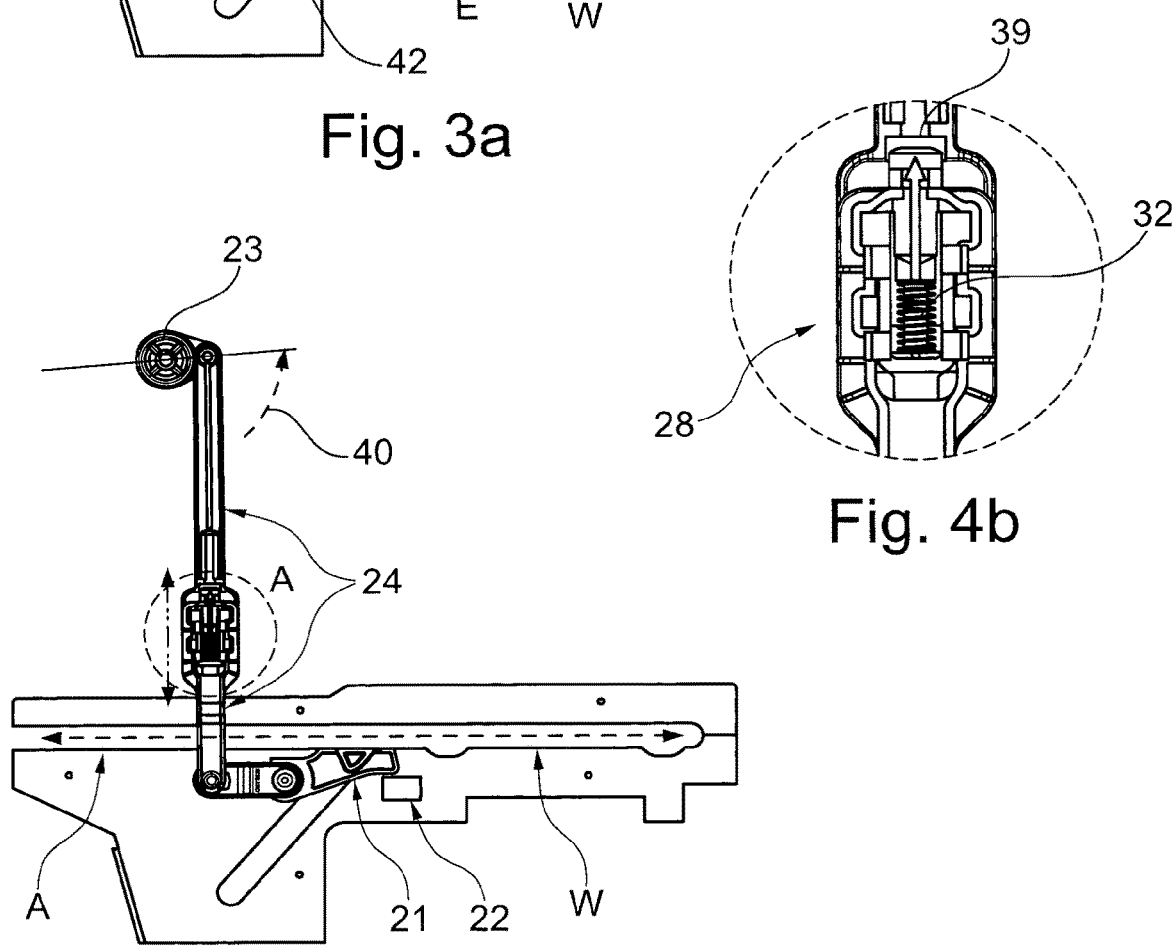
Fig. 4b
Fig. 4a

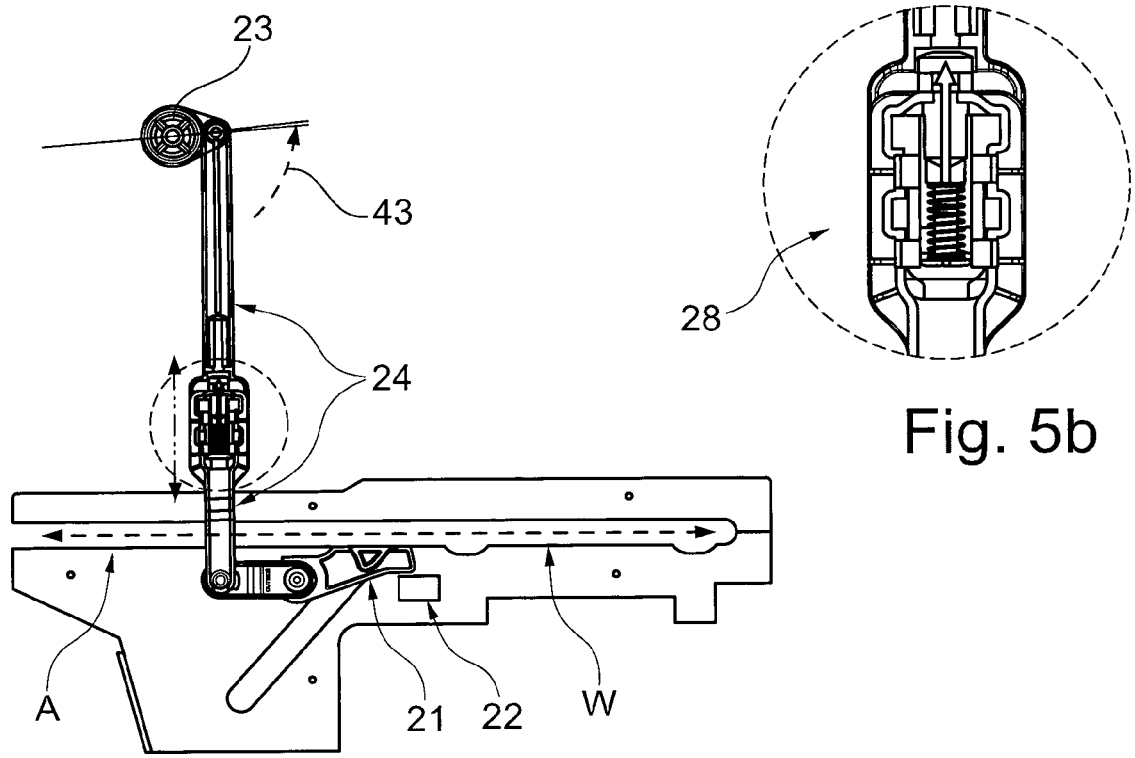
Fig. 5a
Fig. 5b
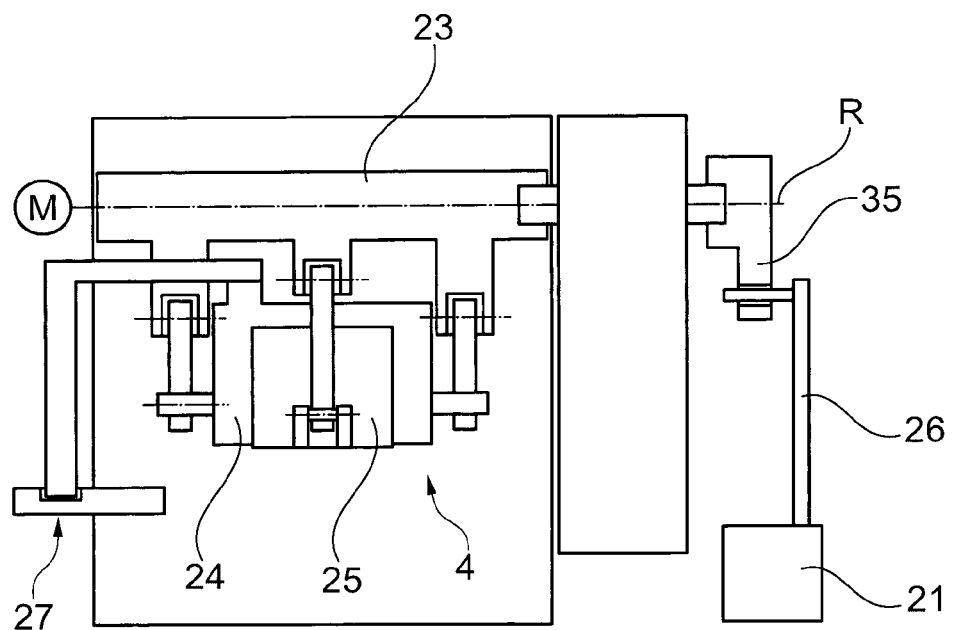
Fig. 6

FOOD-PREPARATION APPARATUS WITH DIVERTER MECHANISM

BACKGROUND OF THE INVENTION

The invention relates to a baking apparatus, preferably a domestic baking apparatus, for forming and baking a food product, preferably a flat bread from a dough portion accommodated in a capsule, having a housing, having a capsule-handling device for opening and/or emptying the capsule, and having an upper plate arranged in the housing, in particular a baking and/or forming plate, and a lower plate, in particular a baking and/or forming plate, which lower plate can be adjusted in a guide device of the baking apparatus along an adjustment path between a receiving position for receiving the dough portion from the capsule, an interaction position for interacting with the upper plate for baking and/or forming, in particular pressing, the dough portion, preferably for producing a flat bread such as a tortilla or for preparation of a pizza bread, and an emptying position, in which the lower plate is inclined relative to a base surface of the baking apparatus, wherein the guide device comprises a diverter with a diverter element, which can be switched between at least two switching positions for predetermining the adjustment distance of the lower plate in the guide device. Furthermore, the invention relates to a method for operating a baking apparatus.

A domestic flat bread baking apparatus is known from WO 2013/124809 A2. This comprises an opening mechanism for dough portion capsules, which comprises a partial-circular-segment-shaped annular blade, which is adjustable relative to a capsule to be opened by means of a stamp in order to pierce a cover film of the capsule by means of the blade and thus open the capsule and empty the dough portion into the apparatus. According to an exemplary embodiment described in the document, it is provided that the dough portion is pressed (flattened) and baked between a lower and an upper baking and forming plate. In this case, the lower plate can be adjusted in a guide device between a receiving position in which it can receive the dough portions from the capsule, an interaction position in which the lower plate cooperates with the upper plate to form and bake the dough portion and a sloping emptying position. wherein the lower plate is arranged in the emptying position so that the finished flat bread is output in the direction of a housing rear side. The guide device comprises two diverter elements which switch via a spring mechanism by adjustment of the lower plate, which predefine the adjustment path of the lower plate in the guide device, wherein the guide device to this end comprises a circumferentially closed guide portion, through which the lower baking plate can travel exclusively in one direction. In the known food-preparation apparatus. the reliability of the switching process is in need of improvement. Furthermore, it is perceived to be disadvantageous that the flat bread is ejected towards the rear.

SUMMARY OF THE INVENTION

Starting from the aforesaid prior art, it is the object of the invention to provide an improved baking apparatus with regard to the reliability of the switching behaviour of the diverter element. Preferably the baking apparatus should be configured in such a manner that the flat bread can be output in the direction of an operating or housing front side.

The object further consists in providing a correspondingly improved operating method for a baking apparatus according to the invention.

This object is solved with regard to the baking apparatus by the features disclosed herein, i.e. in a generic baking apparatus whereby this comprises an electromotive drive assigned to the diverter element for switching the diverter element automatically (between its switching positions).

With regard to the method, the object is solved by the features disclosed herein, i.e. in a generic method whereby the diverter element is adjusted between its switching positions by means of an electromotive drive, wherein preferably an adjustment of the diverter element by means of the electromotive drive takes place from a first switching position into a second switching position after the lower plate has been adjusted from the receiving position in the direction of the interaction position (and preferably before the lower plate touches the diverter element on its adjustment path in the direction of the emptying position) in order to release an adjustment path in the direction of the release position and/or the diverter element is adjusted from the second switch position, in particular back, into the first switch position after the lower plate has been adjusted from the emptying position, in particular back in the direction of the interaction position, in order to release the adjustment path, in particular back, into the receiving position (preferably also before the lower plate touches the diverter element on its path back into the receiving position).

Advantageous further developments of the invention are also specified herein and in the subclaims, and all combination of at least two features disclosed in the description, the claims, and/or the figures come within the framework of the invention.

In order to avoid repetitions, features disclosed according to the apparatus are deemed to be disclosed empirically and can be claimed. Likewise, features disclosed according to the method are also deemed to be according to the apparatus and can be claimed.

The invention is based on the idea of providing an electromotive drive for switching the at least one, preferably single diverter element in order to be able to control the switching process and time precisely. Furthermore, the assignment of an electromotive drive to the diverter element makes it possible to build a simpler guide device, preferably without a circumferentially closed guide portion which can only be travelled in a single direction and/or makes it possible to dispense with several diverter elements having different functions. In addition, it is possible to dispense with a switching of the diver ter element by force application of the same means of the lower plate, whereby any tilting or other guide disturbances can be reliably avoided.

Preferably the first and/or second switching position, quite particularly preferably the first switching position of the diverter element is defined by a preferably fixed stop inside the housing which in this respect delimits the adjustment movement, in particular pivoting or rotational movement of the diverter element, which is actuated via the electromotive drive.

In the present disclosure, the terms or positional information "below" or "lower" and "above" or "upper" relate to a corresponding relative position along a vertical when the baking apparatus is set up as intended by means of corresponding support surfaces, preferably formed by standing feet, on a horizontal base or set-up area which is then configured to be parallel to a base surface of the baking apparatus. In other words, these terms relate to a position along a housing vertical axis extending perpendicular to the surface extension of the support surfaces or a base surface spanned by this. In this connection, a sloping or inclined arrangement then also means an arrangement in which the lower plate encloses an angle with the horizontal running perpendicular to the vertical or the set-up plane so that the lower plate is inclined, in particular in such a manner that the finished food product in the emptying position, in particular independently or due to gravity overcomes a corresponding frictional resistance and slides downwards along the lower plate, in particular in a container or receiving chamber preferably formed by a drawer and can be removed from there, in particular manually.

With a view to the specific configuration of the guide device, there are various possibilities. It is essential that the lower guide plate, preferably driven by an electromotive drive, is in guiding interaction with a guide system, in particular a guide rail or link. In this case, it is possible for example, if the lower plate engages via a lateral extension in a guide rail or link and is guided in this and/or on this during its adjustment movement.

It is fundamentally possible that the guide device comprises respectively one diverter element arranged by means of the electromotive drive on two mutually opposite sides of the lower plate, wherein the diverter elements are preferably adjustable simultaneously with the electromotive drive. To simplify the construction, it is preferred if a diverter element, in particular a single diverter element, is only provided on a single side of the lower plate. For the case where two diverter elements are provided, it is preferred if these have the same function and are accordingly arranged symmetrically.

As mentioned, the lower baking plate is preferably adjustable by means of an electromotive drive guided in the guide device between the previously explained three different positions—alternatively a manual adjustability can also be achieved, wherein the lower baking plate is preferably assigned a corresponding handle or manual adjustment means.

In the interaction position, the lower plate is preferably located in a baking chamber inside the housing, which quite particularly preferably has its own, preferably at least for the most part, metallic baking chamber housing inside the apparatus housing. In the receiving position and/or the emptying position, the lower baking plate is preferably located at least for the most part outside the baking chamber.

It is fundamentally possible that heating means separate from the upper and/or lower plate are provided for baking the dough portions, and it is quite particularly preferable if the lower and/or upper plate are configured as heating plate/s, i.e. having heating means adjustable with the respective plate. Additionally or alternatively, the lower and/or upper plate are preferably used for direct application of force to the dough portion during the forming process, in particular pressing process to flatten the dough portion to form the food (food product).

It is fundamentally possible that the diverter element is assigned its own or a separate electromotive drive for the switching process. Preferred however is an embodiment in which the electromotive drive for switching the diverter element is an electromotive drive which takes over at least one further function of the baking apparatus, quite particularly preferably an electromotive drive of the capsule-handling device for actuating a capsule opening and/or emptying mechanism for opening and/or emptying, in particular empty pressing, the capsule, preferably accompanied by deformation of the same. It is quite particularly expedient if the electromotive drive comprises a drive assigned to the plunger of the capsule-handling device, which actuates this device, by means of which pressure can be applied to the capsule for emptying the dough portion from the capsule and/or a drive of a holding-down stamp, which is preferably adjustable relative to the plunger, for adjusting the capsule against an opening element, in particular a blade, quite particularly preferably an annular blade, for piercing a capsule top, in particular a cover film. Particularly preferred here is an already indicated embodiment in which the capsule-handling means comprise both a plunger and also a holding-down stamp, wherein the holding-down stamp is preferably adjustable relative to the plunger and the opening element, in particular the blade, preferably by means of the electromotive drive for adjusting the diverter element, wherein the holding-down stamp is preferably configured and arranged in such a manner that force can be applied by this stamp to the capsule, in particular in the region of a radially protruding capsule circumferential edge, for adjusting the capsule against the opening element and thereby piercing the capsule by means of the opening element. Preferably the capsule is additionally fixed and positioned relative to the blade by means of the holding-down stamp after opening inside the housing of the apparatus, in particular by clamping the afore-mentioned radially projecting circumferential edge of the capsule between the holding-down stamp and a stop. The stop can be formed in this case by a support portion for the capsule, which is preferably adjustable against the spring force of at least one return spring together with the capsule by application of force to the capsule by means of the holding-down stamp relative to the blade against a (fixed) stop positioned fixedly with respect to the blade. Alternatively, by dispensing with such a preferably provided stop portion, the capsule can be adjusted directly against a stop positioned fixedly relative to the blade.

Preferably the capsule-handling device comprises a capsule drawer which can be moved out from the housing, in particular a front side, in order to place a (new) capsule on the capsule drawer in this withdrawn position and be able to move this with the capsule into the housing, in particular into a region above the receiving position of the lower plate so that the dough portion, in particular during the emptying process of the capsule can drop or slide by means of the plunger downwards onto the lower plate. Regardless of the provision or an aforementioned capsule drawer, which preferably contains the aforementioned support portion or stop for the capsule, it is preferable if the lower plate in its receiving position is located in a region underneath the capsule-handling device, in particular in a plan view along the vertical from top to bottom inside a projection surface of the capsule-handling device so that a dropping down and/or sliding of the dough portion from the capsule onto the lower olate can be ensured in its receiving position.

As a result of the double or multiple use of the electromotive drive for the capsule opening and/or emptying mechanism, costs for a separate drive can be saved without negatively influencing the functionality of the switching mechanism for the diverter element.

It is quite particularly preferred that the diverter element is coupled to the electromotive drive in such a manner that the diverter element can be actuated by rotating the electromotive drive, wherein electromotive drive and diverter element are mechanically coupled via force transmission means. It is quite particularly preferred if an eccentric shaft can be rotated by means of the electromotive drive and the diverter element is operatively connected to the eccentric shaft via the force transmission means, in particular with radial spacing from the axis of rotation thereof. For the preferred case that the electromotive drive for the diverter element simultaneously comprises an electromotive drive for adjusting a plunger and/or a holding-down stamp, it is preferred if the plunger and/or holding-down stamp, in particular at different circumferential positions about the axis of rotation in the same way as the afore-mentioned force transmission means are connected in an articulated manner to the eccentric shaft. In particular, this is accomplished in such a manner that a forced coupling of diverter element and plunger and/or holding-down stamp results in such a manner that during an adjustment of the diverter element, the plunger and/or the holding-down stamp are also moved automatically.

In particular but expressly not exclusively for the case where the electromotive drive for the diverter element is an electromotive drive of the capsule-handling device, it is preferred if the force transmission means by means of which a rotational movement of the electromotive drive can be converted into an adjustment movement, in particular pivoting movement of the diverter element, comprise a tolerance compensating device (tolerance compensating means) which comprises two force transmission elements, which are adjustable relative to one another, preferably translationally, by rotation of the electromotive drive (M) relative to one another contrary to a spring force of at least one tolerance compensating spring, in particular rod elements guided translationally relative to one another. It is particularly expedient in this case if one of the force transmission elements is guided translationally adjustably in sections in the other of the force transmission elements. As a result of the provision of the tolerance-compensating spring means, a precise maintaining of the switching positions of the diverter element can be ensured despite various additive component tolerances. Preferably the tolerance-compensating spring is arranged in a region between the force-transmission elements and is supported in a force-transmitting manner on both force-transmission elements. Quite particularly preferably the at least one, preferably exclusively one, tolerance compensating spring, in particular a spiral spring, even further preferably a compression spring, is arranged in such a manner that this can be tensioned under the action of the tensile force of the force transmission elements by means of the electromotive drive, in particular by pressing together or compression of the tolerance-compensating spring. In this case, it is quite particularly preferably preferred if the tolerance compensating spring is tensioned, in particular compressed or pressed together in a switching position of the diverter element, in particular the second switching position, which enables an adjustment of the lower plate from the interaction position into the emptying position. Preferably the tolerance-compensating spring is arranged in such a manner that this strives to press the force-transmission elements apart or to enlarge the overall length extension of the force-transmission means.

In particular, the previously explained driving of the diverter element via an electromotive drive of the capsule-handling device, in particular via the mentioned eccentric shaft, fundamentally system-induced tolerances in relation to the angle of rotation of the electromotive drive and/or the eccentric shaft will adversely affect the function of the diverter. In particular, the tolerances can result in incorrect positions when switching the diverter element, which could have the result that the switched switching position or guide direction or the intended adjustment path for the lower plate would be blocked by the diverter element itself. By integrating the aforementioned tolerance compensation in the diverter dement drive train, a safe switching of the diverter element into the switching positions should be ensured.

Quite particularly preferably the tolerance-compensating device comprises a stop which delimits the relative movement of the force-transmission elements of the force-transmission means. Quite particularly preferably this is an alignable or adjustable stop, in order to limit this maximum relative movement of the force-transmission elements, in particular towards one another. In the simplest case, a screw can be provided as a stop for this purpose, wherein the screw-in section into an appurtenant internal thread determines the effective length of the stop. Quite particularly preferably the tolerance-compensating spring is supported on the stop indirectly or directly, preferably on a side facing away from the stop surface of the stop. In this case, it is particularly preferred if by alignment or adjustment of the stop, a spring pre-tension of the at least one tolerance-compensating spring can be set at the same time.

As already mentioned, it is preferred if the diverter element is pivotable about a pivot axis between its adjustment position by means of the electromotive drive, wherein one of the force-transmission elements is connected in an articulated manner to the diverter element at a distance from the pivot axis. Quite particularly preferably at least the, preferably exclusively the first switching position is defined by a stop which is fixed in position or fixed on the housing, in the housing with which the diverter element interacts strikingly in the first switching position, with the result that a further adjustment movement of the diverter element is limited despite a possible further rotation of the drive motor—this possible further movement or further rotational movement of the drive motor can then be intercepted or compensated by means of the tolerance-compensating device, in particular by tensioning or releasing the tolerance-compensating spring.

Preferably the guide device is configured in such a manner than the lower plate in the emptying position is inclined towards a housing front side preferably having a capsule drawer insertion opening and/or at least one input element for user inputs and/or at least one display and/or is arranged at least in sections, so that the finished food product can slide in the direction of the housing front side, in particular into a container. It is quite particularly preferred if, additionally or alternatively to the preceding features, the guide device at least in sections, preferably over the greatest part of its longitudinal extension in its receiving position is arranged below, in particular in a vertical projection surface of a preferably provided plunger and/or of a preferably provided holding-down stamp of the capsule-handling device and/or below a preferably provided capsule drawer for feeding a new capsule into the housing.

The assignment according to the invention of an electromotive drive to the diverter element allows a particularly simple structure of the guide device. This preferably comprises a rectilinear, in particular (when the baking apparatus is set up as intended on a horizontal set-up surface) horizontal, first guide portion for adjusting the lower plate between the receiving position and the interaction position and a second, preferably rectilinear or curved, second guide portion, arranged at an angle to the first guide portion, which is preferably inclined downwards and in the direction of the housing front side, for adjusting the lower plate, in particular from the interaction position, into the emptying position. The diverter element is preferably located in the region of a crossing or branch point between the first and the second guide portion, and preferably in the first switching position releases the rectilinear adjustment path between the receiving position and the interaction position and in the second switching position, release the adjustment path from the interaction position into the emptying position, wherein it is preferable if the diverter element in the second switching position blocks the direct path back from the interaction position into the receiving position and/or the diverter element in the first switching position blocks the direct path from the interaction position back into the receiving position.

A particularly preferred embodiment which can be achieved by providing the electromotive drive for adjustment of the diverter element provides that the second guide portion of the guide device is configured as a dead end portion, i.e. in such a manner that after reaching the final emptying position, the lower plate must be moved back along the same path along the second guide portion and cannot run through this completely in a single direction, as is achieved in the prior art.

Quite particularly preferably the emptying position of the lower plate is assigned a receiving chamber or container for a ready baked food product preferably formed by a food drawer which can be removed from a housing front side, inside the housing.

The invention also relates to a method for operating a baking apparatus according to the invention. According to the invention, it is provided that the diverter element of the guide device is adjustable between its switching positions by means of an electromotive drive, in particular a drive of capsule-handling means, quite particularly preferably in such a manner that after adjustment of the lower plate from the receiving position in the direction of the interaction position, in particular into the interaction position, the diverter element is adjusted from a first switching position into a second switching position in order to thus release the adjustment path in the direction of the inclined emptying position and block the adjustment path directly back into the receiving position and/or that after the lower plate has been returned from the emptying position into the preferably horizontal interaction position, the diverter element is adjusted from the second into the first switching position in order to release the adjustment path into the receiving position and block the adjustment path into the emptying position.

It is quite particularly preferred if the force-transmission means, as mentioned are driven via an eccentric shaft. In this case, it is further preferred if, when the lower plate is located in the receiving position and at the same time the diverter element is located in the first switching position, an articulation point of the force-transmission means to the eccentric shaft is rotated about the axis of rotation of the eccentric shaft after the lower plate has been adjusted in the direction of the interaction position in order to thus adjust the diverter element into the second switching position. It is then preferred if, after the lower plate has been adjusted from the interaction position into the emptying position and back again into the interaction position, the eccentric shaft is not moved back again but is moved further in the same direction of rotation in order to move the diverter element back into the first switching position. Preferably after adjustment of the lower plate into the receiving position, the eccentric shaft is then rotated back again in the opposite circumferential direction and thereby runs through the second switching position of the diverter element, which then adopts the first switching position again. Such an embodiment is particularly preferred when the drive simultaneously with the diverter element moves the afore-mentioned plunger and/or the afore-mentioned holding-down stamp.

BRIEF DESCRIPTION OF THE DRAWINGS

Further advantages, features, and details of the invention are obtained from the following description of preferred exemplary embodiments and with reference to the drawings. In the Figures:

FIG. 1 shows a highly schematic diagram of a preferred exemplary embodiment of a food-preparation apparatus here configured as a domestic baking apparatus, configured according to the concept of the invention, FIG. 1a to FIG. 5b show a guide device with diverter of the food-preparation apparatus shown in FIG. 1 in various operating or switching states.

FIG. 6 shows a schematic of a possible preferred implementation of a drive train for driving the diverter element of the guide device with a common electromotive drive for driving a plunger and a holding-down stamp of a capsule-handling device of the food-preparation apparatus and for simultaneously switching or driving the diverter element of the guide device.

In the figures the same elements and elements having the same function are characterized by the same reference numbers.

DETAILED DESCRIPTION

Figure 1C:
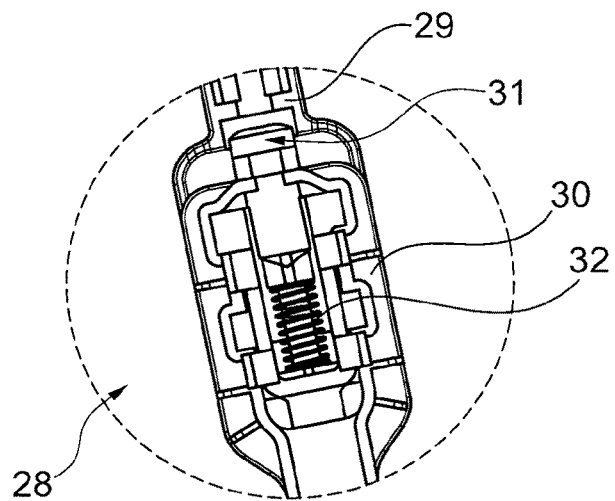

FIG. 1 shows a food-preparation apparatus 1 for baking and forming a dough portion 2 initially still accommodated in a capsule, for example made of plastic or a light metal alloy. The dough portion 2 is emptied inside a housing 3 of the food-preparation apparatus 1 by means of a capsule-handling device 4 from a capsule not shown, in particular a disposable capsule, and then, as will be explained in further detail hereinafter, is further processed, in particular by forming (pressing) and baking to form a foodstuff 5 (food product), in the present case a flat bread. The capsule-handling device 4 is configured in such a manner that individual (portion) capsules can be opened with this and the dough portion 2 can be emptied from the capsule. For this purpose, the capsule-handling device 4 preferably comprises a plunger to be explained in further detail subsequently, for application of pressure, in particular deformation of the capsule and/or its bolding-down stamp for adjustment of the capsule against a blade. The housing 3 of the food-preparation apparatus comprises a housing front side 6 with operating elements not shown and/or a display. Preferably located in the housing front side 6 is a capsule drawer opening for withdrawing and inserting a preferably provided, optional capsule drawer. The food-preparation apparatus 1 further comprises inside the housing 3 a baking chamber 7 with a baking chamber housing 8, in the present case made of metal sheet for shielding the temperature of between about 170° C. and 250° C. which occur during the baking process. The food-preparation apparatus 1 or the housing thereof additionally comprises a base side 9 which, when the food-preparation apparatus 1 is set up as intended on a horizontal surface, is facing this. Support surfaces 10, in the present case configured as standing feet are realized on the housing 3, which define a lowermost region of the food-preparation apparatus 1 along a vertical V which extends perpendicular to the horizontal H. The support surfaces define a base surface 46 of the apparatus which is aligned horizontally when set up as intended.

The food-preparation apparatus 1 comprises a lower plate 11, configured in the present case as a combined baking and forming plate, which is shown three times or in three different functional positions in FIG. 1, namely a receiving position A on the left in the plane of the drawing, adjusted in the direction of the housing front side 6, in a region along the vertical V below the capsule-handling device 4 in order to be able to receive the dough portion emptied from the capsule. From the receiving position A the lower plate 11 can be adjusted, in the present case in the direction of a housing rear side 13 facing away from the housing front side 6 or opposite to this, into an interaction position W in which the lower plate 1 cooperates with an upper plate 14, also configured as a combined baking and forming plate, for forming and baking the dough portion 2, which is indicated once again in the present case, in the baking chamber 7. For this purpose the upper plate 14 is height-adjustable along the vertical V relative to the lower plate 11 in order to deform or flatten by pressing and to bake the dough portion 2. After the baking process the lower plate 11 is adjusted from the interaction position into an emptying position 11 which is moved out from the baking chamber 7 at least for the most part, in which the lower plate 11 encloses an angle with the horizontal H, here for example merely of about 45° in order to bring about an independent sliding of the food product 5 into a container 15, which in the present case is configured as a food drawer, which can be removed from the housing front side 6 together with the finished food product. It can be seen from FIG. 1 that the upper plate 14 is located along the vertical V inside the baking chamber 7 above the lower plate 11. The lower plate 11 and the upper plate 14 are aligned parallel in the interaction position W, here in the present case as preferred horizontally. Likewise the lower plate 11 in its receiving position A is aligned horizontally and only angled or inclined in the emptying position E.

For adjustment of the lower plate 11 between its three different function positions, preferably an electromotive drive, not shown, is provided as well as a guide device 16 explained hereinafter with reference to FIGS. 1a to 5b, which guides the lower plate 11 during its adjustment movement. For this purpose, the guide device 16 comprises a link 17, in which the lower plate 11 interacts with at least one lateral guide extension 18. If required, another, here as rear guide extension 19 can be provided which is also adjustable in the link 17.

The guide device 16 comprises a diverter 20 (diverter mechanism) with a pivotally arranged diverter element 21 which is adjustable between two switching positions by means of a schematically indicated electromotive drive M, wherein in the first switching position shown in FIG. 1a, which is defined or limited by a fixed stop 22, the lower plate 11 is adjustable by means of the drive assigned to it—between the receiving position A and the interaction position W. The diverter element 21 can additionally be adjusted, here pivoted, by actuation by means of the electromagnetic drive M into a second switching position shown in FIG. 3a in which an adjustment of the lower plate 11 between the interaction position W and the (inclined) emptying position E is possible. By means of the electromotive drive M, an eccentric shaft 23 is rotatable about an axis of rotation R, wherein the diverter element 21 is connected via force transmission means 24 in an articulated manner to the eccentric shaft 23 with radial spacing from the axis of rotation R. The diverter element 21 is arranged pivotably about a fixed pivot axis S, wherein the force transmission means 24 are connected in an articulated manner to the diverter element with spacing from the pivot axis S. As will be explained in further detail subsequently (cf. FIG. 6), an (emptying) plunger 25 and a holding-down stamp 26 are additionally connected in an articulated manner to the eccentric shaft 23 or coupled adjustably so that in the preferred exemplary embodiment, the electromotive drive M is a common electromotive drive of an opening and/or emptying mechanism of the capsule-handling device 4 and the diverter 20. In addition, a locking mechanism 27 for a preferably provided capsule drawer can be actuated in an advantageous manner by means of the electromotive drive M by adjustment of the holding-down stamp 26.

The link 17 comprises a horizontal first guide portion 41 inside which the lower plate is adjustable between the receiving position A and the interaction position W and a second guide portion 42 spanning an angle thereto via which the lower plate 11 enters in the removal position E, the second guide portion 42 is configured as a dead end portion so that the lower plate 11 or the guide extension 18 must be moved back again over the same path in the direction of the interaction position W in order to leave the emptying position E again.

The force transmission means 24 is assigned a tolerance-compensating device 28 in order to compensate for system-induced tolerances in relation to the angle of rotation of the eccentric shaft 23 or to take care that these do not adversely influence the function of the diverter 20. To this end, the force transmission means 24 comprise two force-transmission elements 29, 30 arranged in alignment along the longitudinal extension thereof, which are adjustable relative to one another. The force-transmission elements 29, 30 are mounted so that they can be adjusted slidingly translationally into one another and the rectilinear sliding movement towards one another (pressure loading in the second switching position) is delimited by means of an adjustable stop 31, here configured as a screw, and the movement away from one another (tensile loading in switching position 1) is delimited by means of a tolerance-compensating spring 32. The stop 31 is, as mentioned, adjustable or adaptable whilst simultaneously varying the pre-tension of the tolerance-compensating spring 32 which is supported axially at one end on the stop 31 on the side facing away from a stroke-limiting stop surface 33 on the stop 31, wherein the stop 31 is part of the lower force-transmission element 30 in the plane of the drawing. With its other axial end the tolerance-compensating spring 32 is supported on the upper force-transmission element 29 in the plane of the drawing.

As mentioned, the diverter element 21 in the diagram according to FIGS. 1a and 1b is located in the first switching position. The lower plate 11 cooperates with the diverter element 21 during adjustment of the lower plate 11 via the guide extension 18. In the diagram in the operating state according to FIG. 1a, the lower plate 11 is initially still located in the receiving position A and is the adjusted in the direction of the interaction position W. The eccentric shaft or the articulated connection 34 between the force transmission means 24 and a radial eccentric extension 35 of the eccentric shaft 23 is located, here for example in the clockwise direction in its end position 36. The diverter element 21 (switch element) of the diverter 20 lies horizontally in the guide device and is supported on the step 22. The force transmission means 24 are tensile loaded, as indicated by the double arrow in FIG. 1a, which has the result that the tolerance-compensating spring 31 is compressed between the force-transmission elements 29, 30 in tolerance compensation or is further tensioned. The diverter element 21 is held via the force transmission means 24 and the spring force of the tolerance-compensating spring of the tolerance-compensating device 28 in the depicted (horizontal) first switching position.

In FIG. 1c the tolerance-compensating device 28 is shown enlarged again, wherein for easier differentiation of the parts which are adjustable relative to one another, the lower force-transmission element 30 in the plane of the drawing is coloured grey in the same way as the stop 31 configured as a screw, which is arranged in a fixed position relative to this lower force-transmission element 30. The mechanism of action between the force-transmission elements 29, 30 can be identified, which has the effect that under a tensile force loading the tolerance-compensating spring 32 is compressed.

Figure 2B:
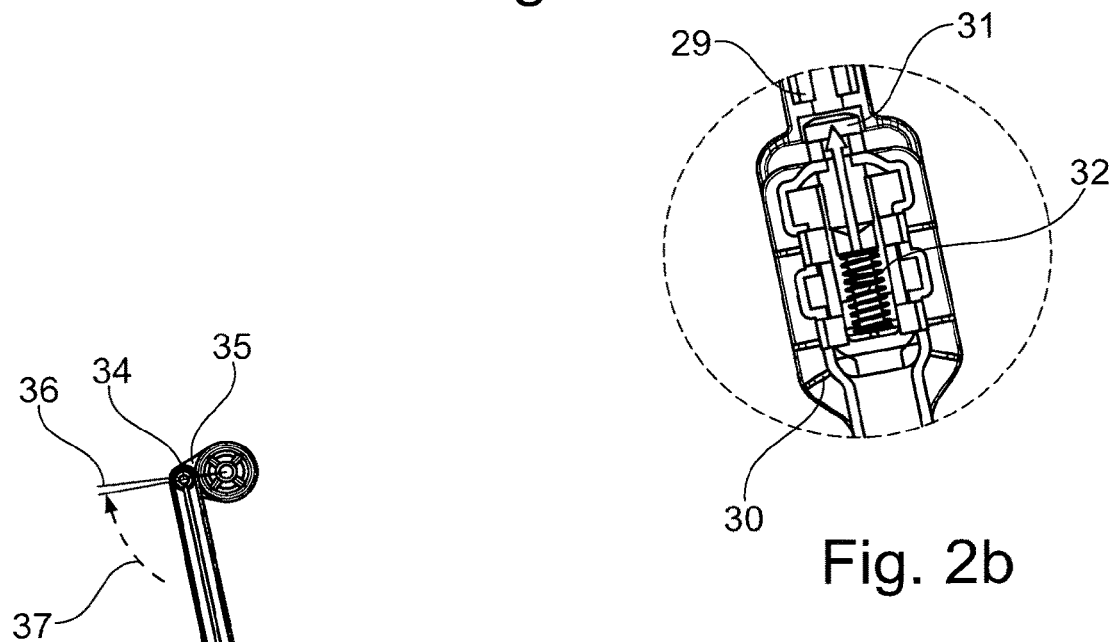
Figure 2A:
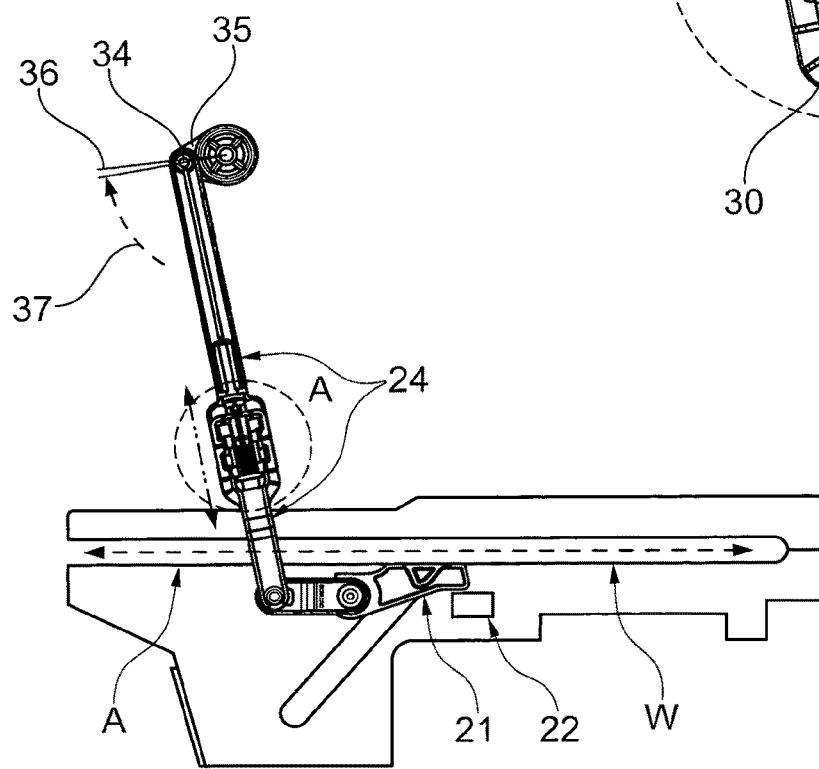

In FIGS. 2a and 2b the first switching position of the diverter element 21 is shown again but here the articulated connection 34 between the force transmission means 24 and the eccentric 35 is 5° at one position 37 in the clockwise direction before the end position 36. The diverter element 21 lies horizontally and is supported on the stop 22 similarly to the state according to FIG. 1a. The force transmission means 24 are tensile-loaded which has the result that the spring is compressed between the force-transmission elements 29, 30 but as a result of the upstream rotational or tolerance situation of the eccentric shaft somewhat less strongly than in the desired target position according to FIG. 1a. Nevertheless, the switching situation or the switching position 1 is ensured. For this purpose reference is made to the enlarged view according to FIG. 2. The arrow shown there indicates the tolerance compensation.

FIGS. 3a and 3b show the second switching position of the diverter element 21 which now blocks the path back into the receiving position and during an adjustment movement of the lower plate 11, deflects this into the sloping emptying position E due to interaction with the guide extension. In order to reach this second switching position, the eccentric shaft 23 was adjusted by means of the electromotive drive in the anticlockwise direction into the depicted position 38. In this case, the force-transmission elements 29, 30 are moved towards one another until the stop 31 (in the present case, for example, the screw) abuts against an opposite stop position 38 of the upper force-transmission element 29 in the plane of the drawing. The adjustable stop 31 enables the length of the two divided force transmission means in this exemplary embodiment or the two force-transmission elements 29, 30 in this second switching state and therefore the oblique position of the diverter element to be adapted.

It can be seen from FIG. 3a that as a result of the configuration of the second guide portion 42 as a dead end portion, the lower plate 11 must be conveyed back in the same direction in order to leave the emptying position E again.

In the exemplary embodiment according to FIGS. 4a and 4b the eccentric shaft 23 was moved further in the anticlockwise direction into circumferential position 40 which forms a further end position to the end position described in connection with FIG. 1. The diverter element 21 again lies horizontally so that the lower plate 11 can be adjusted from the interaction position W back into the receiving position A.

The diverter element 21 is again supported on the end stop 22 which in this respect defines the second switching position. The force transmission means 24 are tensile-loaded which has the result that the tolerance-compensating spring 32 is compressed between the force-transmission elements 29, 30 and thus further tensioned. The diverter element 21 of the diverter 20) is held via the spring force of the tolerance-compensating spring of the tolerance-compensating device 28 in the second switching position.

FIGS. 5a and 5b show by analogy with FIG. 2a a tolerance-induced possible operating situation in which the eccentric shaft 23 is located approximately 5° in front of the end position 40 according to FIG. 4a in a circumferential position 43.

Here also the force application means are tensile-loaded and the spring compressed but less strongly than in the actual target position according to FIG. 4a and FIG. 4b.

FIG. 6 shows a schematic view of the eccentric shaft 23 which can be rotated by means of the electromotive drive M and thereby not only switches the diverter element 21 but also moves the plunger 25 and the holding-down stamp 26 which is part of the capsule-handling device 4.

Figure 7A:
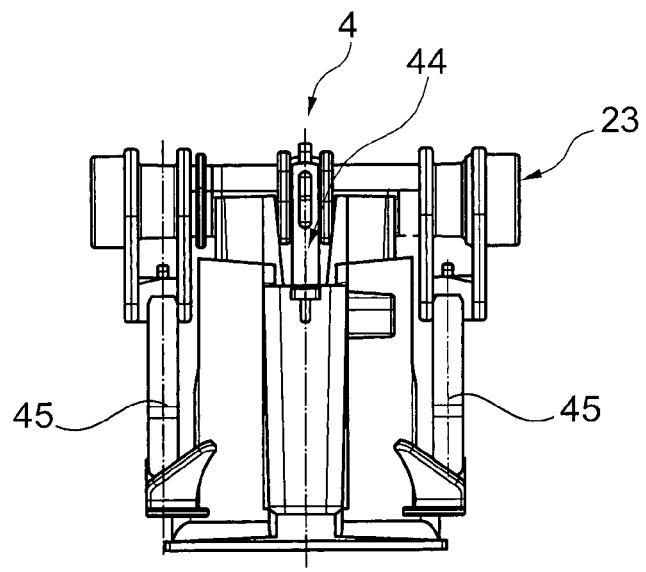
FIG. 7a and FIG. 7b show various diagrams of the capsule-handling device according to FIG. 6.
Figure 7B:
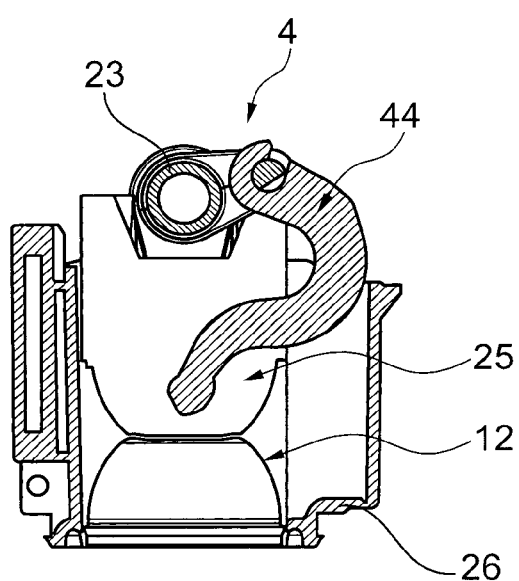

FIGS. 7a and 7b show the force-transmission device 4 in different views. Shown is the eccentric shaft 23 which can be rotated by the electromotive drive M not shown, by means of which via articulated levers the plunger 25 can be moved relative to the holding-down stamp 26 guided translationally adjustably therein in order to adjust with the holding-down stamp a capsule 12 for opening the same against a blade which is not shown and in particular to then press out the dough portion from the capsule 12 by means of the plunger 25.

REFERENCE LIST

1 Food-preparation apparatus
2 Dough portion
3 Housing
4 Capsule-handling device
5 Foodstuff/food product
6 Housing front side
7 Baking chamber
8 Baking chamber housing
9 Base side
10 Supporting surface
11 Lower plate
12 Capsule
13 Housing rear side
14 Upper plate
15 Container
16 Guide device
17 Link
18 Guide extension
19 Further guide extension
20 Diverter
21 Diverter element
22 Stop for diverter element
23 Eccentric shaft
24 Force transmission means
25 Plunger
26 Holding-down stamp
27 Locking mechanism
28 Tolerance-compensating device
29 Force-transmission element
30 Force-transmission element
31 Stop of tolerance-compensating device
32 Tolerance-compensating spring
33 Stop surface of stop 31
34 Articulated connection
35 Eccentric extension
36 End position in clockwise direction
37 Circumferential position before target end position
38 Circumferential position in second switching position
39 Stop counter position
40 End position in anticlockwise direction
41 First guide portion
42 Second guide portion
43 Circumferential position before target end position 44 Articulated lever
45 Articulated lever
46 Base surface
A Receiving position
W Interaction position
E Emptying position
M Electromotive drive
R Axis of rotation of eccentric shaft
S Pivot axis

The invention claimed is:

1. A baking apparatus, for forming and baking a food product (5), from a dough portion (2) accommodated in a capsule (12), having a housing (3), having a capsule-handling device (4) for opening and/or emptying the capsule (12), and having an upper plate (14), and a lower plate (11), arranged in the housing (3), which lower plate can be adjusted in a guide device of the baking apparatus along an adjustment path between a receiving position (A) for receiving the dough portion (2) from the capsule (12), an interaction position (W) for interacting with the upper plate (14) for baking and/or forming the dough portion, and an emptying position (E), in which the lower plate (11) is inclined relative to a base surface (46) of the baking apparatus (1), wherein the guide device has a diverter (20) with a diverter element (21), which can be switched between at least two switching positions for predetermining the adjustment distance of the lower plate (11) in the guide device, wherein the baking apparatus comprises an electromotive drive (M) assigned to the diverter element (21) for switching the diverter element (21) automatically, wherein the guide device comprises a rectilinear first guide portion (41) for adjusting the lower plate (11) between the receiving position (A) and the interaction position (W) and a second guide portion, arranged at an angle to the first guide portion (41), for adjusting the lower plate (11), from the interaction position (W), into the emptying position (E), and wherein the second guide portion (42) is configured as a dead end portion.

2. The baking apparatus according to claim 1, wherein the electromotive drive (M) is a drive for actuating a capsule opening and/or emptying mechanism of the capsule-handling device (4).

3. The baking apparatus according to claim 2, wherein, by means of the electromotive drive (M) a plunger (25) of the capsule-handling device (4) can be driven towards the capsule (12), accompanied by deformation of the capsule (12), for emptying the dough portion (2) and/or a holding-down stamp (26) which is adjustable relative to the plunger (25) can be driven for adjustment of the capsule (12) against an opening element for piercing a capsule top.

4. The baking apparatus according to claim 1, wherein the diverter element (21) can be actuated by rotating the electromotive drive (M), in which an adjustment force can be transferred from the electromotive drive (M) to the diverter element (21) via force transmission means (24), wherein an eccentric shaft (23) can be rotated and the diverter element (21) is operatively connected to the eccentric shaft (23) via the force transmission means (24), with radial spacing from the axis of rotation (R) of the eccentric shaft (23).

5. The baking apparatus according to claim 1, wherein the guide device (16) is configured in such a manner that the lower plate (11) in the emptying position (E) is inclined towards a housing front side (6) having a capsule drawer insertion opening and/or at least one input element for user inputs and/or at least one display and/or is arranged at least in sections, over the greatest part of a longitudinal extension of the guide device (16) in the receiving position (A) below, in a vertical projection surface of a plunger (25) and/or holding-down stamp (26) of the capsule-handling device (4) and/or below a capsule drawer for feeding a capsule (12) into the housing (3).

6. The baking apparatus according to claim 1, wherein the emptying position (E) is assigned a receiving chamber for a ready baked food product (5) formed by a food drawer which can be removed from a housing front side (6), inside the housing (3).

7. The baking apparatus according to claim 1, wherein the rectilinear first guide (41) portion is a horizontal first guide portion, and wherein the second guide portion is rectilinear or curved.

8. The baking apparatus according to claim 1, wherein the second guide portion is inclined downwards and in the direction of the housing front side (6).

9. A method for operating a baking apparatus (1) according to claim 1, wherein a dough portion (2) is emptied from a capsule (12) and in the receiving position (A) of the lower plate (11) is placed on this plate, wherein the diverter element (21) is adjusted between its switching positions by means of an electromotive drive (M) wherein, during movement of the lower plate (11) from the interaction position (W) to the emptying position (E), the lower plate is inclined in a direction of a front side (6) of the housing, and wherein the front side (6) of the housing has at least one of a capsule drawer insertion opening, at least one input element for user inputs, and at least one display.

10. The method according to claim 9, wherein during the adjustment of the diverter mechanism (21) a capsule opening and/or emptying mechanism is actuated.

11. The method according to claim 10, wherein the capsule opening and/or emptying mechanism is a plunger (25) for emptying the capsule (12) and/or a holding-down stamp (26) for adjusting the capsule (12) against an opening element.

12. A baking apparatus, for forming and baking a food product (5), from a dough portion (2) accommodated in a capsule (12), having a housing (3), having a capsule-handling device (4) for opening and/or emptying the capsule (12), and having an upper plate (14), and a lower plate (11), arranged in the housing (3), which lower plate can be adjusted in a guide device of the baking apparatus along an adjustment path between a receiving position (A) for receiving the dough portion (2) from the capsule (12), an interaction position (W) for interacting with the upper plate (14) for baking and/or forming the dough portion, and an emptying position (E), in which the lower plate (11) is inclined relative to a base surface (46) of the baking apparatus (1), wherein the guide device has a diverter (20) with a diverter element (21), which can be switched between at least two switching positions for predetermining the adjustment distance of the lower plate (11) in the guide device, wherein the baking apparatus comprises an electromotive drive (M) assigned to the diverter element (21) for switching the diverter element (21) automatically, wherein the diverter element (21) can be actuated by rotating the electromotive drive (M), in which an adjustment force can be transferred from the electromotive drive (M) to the diverter element (21) via force transmission means (24), wherein an eccentric shaft (23) can be rotated and the diverter element (21) is operatively connected to the eccentric shaft (23) via the force transmission means (24), with radial spacing from the axis of rotation (R) of the eccentric shaft (23), and wherein the force transmission means (24) comprises a tolerance compensating device (28) with two force transmission elements (29, 30) of the force transmission means, which are adjustable relative to one another, by rotation of the electromotive drive (M) relative to one another contrary to a spring force of at least one tolerance compensating spring (32).

13. The baking apparatus according to claim 12, wherein the at least one tolerance compensating spring (32) is arranged in such a manner that the at least one tolerance compensating spring (32) can be tensioned under the action of the tensile force of the force transmission elements (29, 30) by means of the electromotive drive (M), wherein the tolerance compensating spring (32) is tensioned in a switching position of the diverter element (21), which enables an adjustment of the lower plate (11) from the interaction position (W) into the emptying position (E).

14. The baking apparatus according to claim 12, wherein the relative mobility of the force transmission elements (29, 30) is limited by an adjustable stop by means of the adjustment movement of which a spring pre-tension of the at least one tolerance compensating spring (32) can be set.

15. The baking apparatus according to claim 12, wherein the diverter element (21) is pivotally mounted about a pivot axis (S) and is connected in an articulated manner to one of the force transmission elements (29, 30) at a distance from the pivot axis (S).

16. The baking apparatus according to claim 12, wherein the two force transmission elements (29, 30) are adjustable relative to one another translationally, and wherein the force transmission means (24) comprises rod elements (24) guided translationally relative to one another.

17. A method for operating a baking apparatus (1) for forming and baking a food product (5) from a dough portion (2) accommodated in a capsule (12), the baking apparatus having a housing (3), having a capsule-handling device (4) for opening and/or emptying the capsule (12), and having an upper plate (14), and a lower plate (11), arranged in the housing (3), which lower plate can be adjusted in a guide device of the baking apparatus along an adjustment path between a receiving position (A) for receiving the dough portion (2) from the capsule (12), an interaction position (W) for interacting with the upper plate (14) for baking and/or forming the dough portion, and an emptying position (E), in which the lower plate (11) is inclined relative to a base surface (46) of the baking apparatus (1), wherein the guide device has a diverter (20) with a diverter element (21), which can be switched between at least two switching positions for predetermining the adjustment distance of the lower plate (11) in the guide device, wherein the baking apparatus comprises an electromotive drive (M) assigned to the diverter element (21) for switching the diverter element (21) automatically, wherein a dough portion (2) is emptied from a capsule (12) and in the receiving position (A) of the lower plate (11) is placed on this plate, wherein the diverter element (21) is adjusted between its switching positions by means of an electromotive drive (M), wherein during the adjustment of the diverter mechanism (21) at least one tolerance compensating spring (32) is tensioned and/or released between two force transmission elements (29, 30).

\* \* \* \* \*